United States Patent
Sugiura et al.

(10) Patent No.: US 7,583,050 B2
(45) Date of Patent: Sep. 1, 2009

(54) DC POWER SOURCE WITH FUEL CELL AND ELECTRIC POWER STORAGE DEVICE

(75) Inventors: Hiroshi Sugiura, Kariya (JP); Tetsuhiro Ishikawa, Nishikamo-gun (JP); Nobuo Watanabe, Toyota (JP); Kouta Manabe, Gold River, CA (US)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 558 days.

(21) Appl. No.: 10/381,600

(22) PCT Filed: Oct. 2, 2001

(86) PCT No.: PCT/IB01/01811

§ 371 (c)(1), (2), (4) Date: Oct. 9, 2003

(87) PCT Pub. No.: WO02/29916

PCT Pub. Date: Apr. 11, 2002

(65) Prior Publication Data

US 2004/0056633 A1    Mar. 25, 2004

(30) Foreign Application Priority Data

Oct. 4, 2000 (JP) .............................. 2000/304614

(51) Int. Cl.
*H02J 7/14* (2006.01)

(52) U.S. Cl. .................... 320/104; 320/101; 320/103; 320/126

(58) Field of Classification Search ................. 320/104, 320/101, 103, 126, 140, 127, 128, 132, 137, 320/138; 318/599, 612, 139; 322/13, 39; 429/12, 22, 23
See application file for complete search history.

(56) References Cited

U.S. PATENT DOCUMENTS

| | | | |
|---|---|---|---|
| 4,839,574 A | 6/1989 | Takabayashi | |
| 5,929,594 A | 7/1999 | Kimura et al. | |
| 6,670,063 B1 * | 12/2003 | Aoyagi et al. | ................. 429/22 |
| 6,777,909 B1 | 8/2004 | Aberie et al. | |

FOREIGN PATENT DOCUMENTS

| | | |
|---|---|---|
| DE | 197 31 250 | 1/1998 |
| DE | 197 32 117 | 1/1998 |
| DE | 199 32 781 | 12/1999 |
| DE | 199 54 306 A 1 | 7/2001 |
| EP | 0 972 668 | 1/2000 |
| JP | 7-123609 | 5/1995 |
| JP | 7-240212 | 9/1995 |
| JP | 11-067253 | 3/1999 |

(Continued)

*Primary Examiner*—Akm Enayet Ullah
*Assistant Examiner*—Aaron Piggush
(74) *Attorney, Agent, or Firm*—Oblon, Spivak, McClelland, Maier & Neustadt, P.C.

(57) ABSTRACT

A power source system (1) includes a fuel cell (40) and a battery (20) connected in parallel. A DC-DC converter (30) is connected to the battery (20) side. A maximum output ratio of the fuel cell (40) and the battery (20) is set in a range in which the output of the fuel cell falls within 65 to 80% of the total output. Accordingly, electric power loss due to the DC-DC converter (30) is controlled, whereby a high energy efficiency can be achieved.

13 Claims, 6 Drawing Sheets

FOREIGN PATENT DOCUMENTS

| | | |
|---|---|---|
| JP | 2000-12059 | 1/2000 |
| JP | 2000-36308 | 2/2000 |
| JP | 2001-69601 | 3/2001 |
| JP | 2001-204106 | 7/2001 |
| JP | 2002-334712 | 11/2002 |
| JP | 2005-94914 | 4/2005 |
| WO | 99 67846 | 12/1999 |
| WO | WO 99/65725 | 12/1999 |

* cited by examiner

DC POWER SOURCE WITH FUEL CELL AND ELECTRIC POWER STORAGE DEVICE

FIELD OF THE INVENTION

The invention relates to a DC power source using a fuel cell.

BACKGROUND OF THE INVENTION

Fuel cells have been gaining much attention in recent years as a power source with good operation efficiency and environmental characteristics. A fuel cell is a device that generates electricity through an electrochemical reaction of hydrogen and oxygen. A fuel cell outputs electric power as required by controlling the amount of fuel gas supplied. Sometimes, response of output electric power becomes poor due to a response delay of the gas supply amount. As one means for avoiding this problem, there is proposed a technique in which a fuel cell and a battery are connected in parallel to constitute the power source. For example, Japanese Patent Application Laid-Open No. 2000-12059 discloses a technique in which the output voltage of the fuel cell is converted by a DC-DC converter to allow usage of a battery and a fuel cell in combination. However, in the above-mentioned structure, further improvement of electric power output efficiency was desired.

DISCLOSURE OF THE INVENTION

An objective of the invention is to provide a technology that further improves the output efficiency of a direct current power source using both a fuel cell and an electric power storage device.

In this invention, maximum outputs of the fuel cell and the electric power storage device were set according to the following conditions, in a direct current power source having a fuel cell and an electric power storage device connected in parallel.

In a first structure of the invention, a ratio of a maximum output of the fuel cell to a maximum total output of the fuel cell and the electric power storage device (hereafter referred to as output ratio) is set in a range equal to or greater than 0.65 and equal to or less than 0.8. The energy efficiency of the direct current power source is influenced by the output ratio of the fuel cell and the electric power storage device. The applicants, through their efforts, found that the energy efficiency is optimum when the output ratio is in the above-mentioned range. The output ratio is where the fuel cell can be used as the main power supply.

In a second structure of the invention, the maximum output of the fuel cell is set to a value equal to or greater than the electric power target value continuously output from a terminal for a predetermined period. Consequently, electric power equivalent to the electric power target value can be continuously output from the fuel cell with high operation efficiency, whereby the energy efficiency is improved. In the case where the direct current power source of the invention is applied to a motor-driven vehicle, the above-mentioned electric power target value can be, for example, set based on the cruising performance of the vehicle. The maximum output of the fuel cell may be determined by the ratio of output to the electric power required from the direct current power source.

In a third structure of the invention, the capacity of the electric power storage device is set to be equal to or greater than the maximum value of the electric power input to a terminal from an external device. This allows the electric power input from an external device to be efficiently charged, thereby improving energy efficiency. In the case of applying the direct current power source of the invention to a motor-driven vehicle, the electric power can be, for example, set based on a regenerated electric power recovered upon braking a vehicle by having the motor function as a generator. The capacity of the electric power storage device may be determined by using the ratio of the output of the fuel cell to the electric power required from the direct current power source.

The conditions taken into account in the first to third structures mentioned above may be combined as appropriate to set the outputs for the fuel cell and the electric power storage device. It is most preferable to take into account all the conditions when setting the outputs.

In the first through third structures, the maximum total output of the fuel cell and the electric power storage device is preferably equal to or greater than the maximum electric power required by the output terminal. Accordingly, it is possible to supply electric power that enables the capacities of the load devices connected to the power source to be fully utilized. If the maximum total output is matched with the maximum required electric power, the capacity of the power source can be fully utilized, which optimizes energy efficiency and space efficiency.

The direct current power source of the invention preferably includes a DC-DC converter connected between the electric power storage device and the terminal. In the first through third structures, the frequency with which the electric power of the fuel cell is used is greater than that of the electric power storage device. Electric power loss generated in DC-DC converters during voltage conversion can be controlled by connecting the DC-DC converter to the electric power storage device side having relatively low utilization frequency.

In the invention, the electric power storage device may be, for example, a secondary battery. Other rechargeable devices such as a capacitor may also be used.

The invention can be, in addition to being structured as a direct current power source, structured as various devices using such power source, for example, as a vehicle driven by a motor. Further, the invention may be structured as a method for designing a direct current power source, provided with a step for setting the outputs of the fuel cell and the electric power storage device so as to satisfy the conditions listed for the first through third structures.

DETAILED DESCRIPTION OF THE PREFERRED EMBODIMENTS

Hereinafter, embodiments of the invention as applied to a hybrid vehicle will be described according to the following items.

Figure 1:
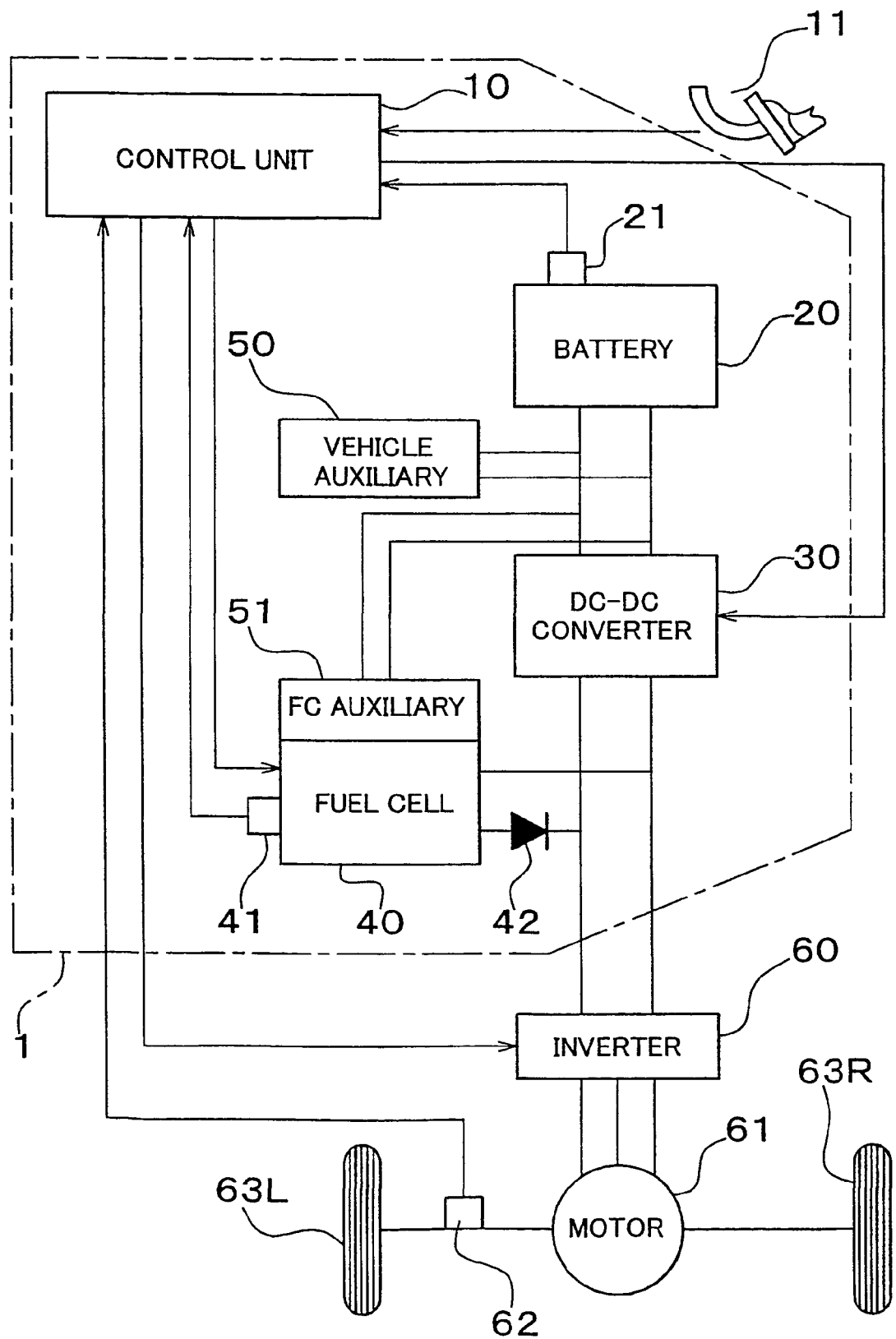
FIG. 1 is an explanatory diagram of a vehicle equipped with a power source system as one embodiment of the invention.

A. Device configuration:
B. Electric power control processing:
C. Setting of output ratio
D. Effect A. Device Configuration:

FIG. 1 is an explanatory diagram of a vehicle equipped with a power source system as one embodiment of the invention. This vehicle runs with a synchronous motor 61 coupled to wheels 63L and 63R as a driving power source. A power source system 1 is the power source for the synchronous motor 61. Direct current output from the power supply system 1 is converted by an inverter 60 into a three-phase alternating current to be supplied to the synchronous motor 61. The synchronous motor 61 is also able to function as a generator during braking.

The power source system 1 includes a fuel cell 40, a battery 20, a DC-DC converter 30, and the like. The fuel cell 40 generates electricity by an electrochemical reaction of hydrogen and oxygen. In this embodiment, a polymer electrolyte fuel cell is used. The fuel cell 40 may be one of various types, including a phosphoric-acid fuel cell and a molten carbonate fuel cell. Hydrogen gas used for generation is generated by reforming raw materials such as alcohol. In this embodiment, a stack that generates electricity, a reformer that generates fuel gas, and the like are comprehensively referred to as the fuel cell 40. Further, in place of the reformer, the system configuration may employ a hydrogen absorbing alloy or a hydrogen cylinder that stores hydrogen itself.

The battery 20 is a rechargeable secondary battery. In this embodiment, a nickel-metal hydride battery is used. Other various types of secondary batteries are also applicable. Instead of the battery 20, an electric power storage device other than a secondary battery, for example, a capacitor may be used.

The fuel cell 40 and the battery 20 are connected in parallel to the inverter 60. A diode 42 for preventing the current from the battery 20 or the current generated by the synchronous motor 61 from reversing is provided in a circuit between the fuel cell 40 and the inverter 60. To selectively use the electricity from the power sources connected in parallel appropriately, a relative pressure difference between the two needs to be controlled. In this embodiment, a DC-DC converter 30 is provided between the battery 20 and the inverter 60 for this purpose. The DC-DC converter 30 is a direct current voltage converter. The DC-DC converter 30 has a function of regulating the DC voltage input from the battery 20 and outputting it to the inverter 60, and a function of regulating the DC voltage input from either the fuel cell 40 or the motor 61 and outputting it to the battery 20. These functions of the DC-DC converter 30 enable charging and discharging of the battery 20.

A vehicle auxiliary 50 and an FC auxiliary 51 are connected between the battery 20 and the DC-DC converter 30. In other words, the battery 20 acts as the power source for these auxiliaries. The auxiliary 50 refers to various electric devices used while driving a vehicle which includes, for example, a lighting device, air conditioning device, and a hydraulic pump. The FC auxiliary 51 refers to various electric devices used for operating the fuel cell 40 which includes, for example, a pump for supplying raw material to be reformed and a heater for regulating the temperature of the reformer.

Operation of the respective elements are controlled by a control unit 10. The control unit 10 is configured as a microcomputer having a CPU, RAM, and ROM inside. The control unit 10 controls switching of the inverter 60 to output a three-phase alternating current according to the required power to the synchronous motor 61. The control unit 10 controls the operation of the fuel cell 40 and the DC-DC inverter 30 to ensure that an electric power according to the required power is supplied.

To achieve these controls, various sensor signals are input to the control unit 10. These sensors include, for example, an accelerator pedal sensor 11, an SOC sensor 21 that detects the state of charge (SOC) of the battery 20, a flow rate sensor 41 that detects the gas flow rate of the fuel cell 40, and a vehicle speed sensor 62 that detects the vehicle speed. Other sensors connected to the control unit 10 are omitted from the figure.

Figure 2:
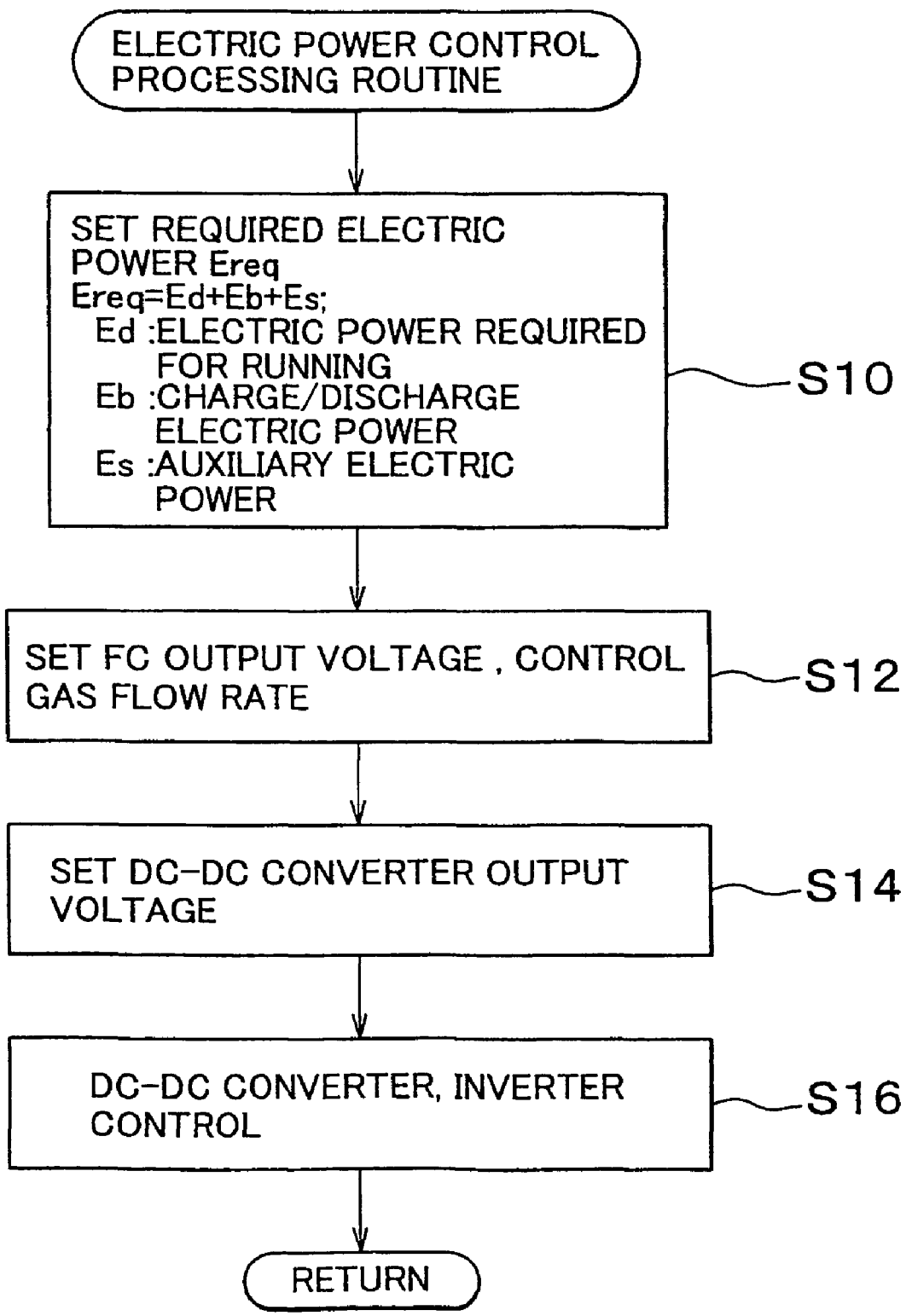
FIG. 2 is a flowchart of electric power control processing while running.

B. Electric Power Control Processing:

FIG. 2 is a flowchart of electric power control processing while running. The control unit 10 repeatedly executes this processing together with other control processing so as to control the driving of the motor 61, thereby enabling a vehicle to be run.

In this processing, the control unit 10 sets a required electric power Ereq for the fuel cell 40 (step S10). The electric power Ereq is determined as a sum of three elements, being an electric power required for running Ed, a charge/discharge electric power Eb, and an auxiliary electric power Es.

The electric power required for running Ed is an electric power that needs to be supplied to the motor 61 to enable a vehicle to be run, and is obtained by the following steps. First, the control unit 10 sets a target revolution and a target torque of the motor 61. These values are obtained from a table for accelerator pedal opening and vehicle speed. A product of the two values yields a power to be output from the motor 61. Electric power required for running Ed is obtained by dividing this power by the operation efficiency of the motor 61, in other words, a ratio of power output per electric power consumption. In the case of using the motor 61 as a generator for regenerative braking, the target torque is a negative value. Accordingly, the electric power required for running Ed is also a negative value.

The charge/discharge electric power Eb is electric power involved in charging/discharging of the battery 20. The SOC of the battery is controlled to be maintained in a predetermined range. The battery 20 is charged when the SOC falls below a predetermined lower limit. The charge/discharge electric power Eb is a positive value according to the electric power required for charging. Consequently, the required electric power Ereq increases as the battery 20 is charged. On the other hand, the battery 20 is discharged when the SOC exceeds a predetermined upper limit. The charge/discharge electric power Eb is a negative value according to the discharge electric power. The required electric power Ereq decreases as the battery 20 is discharged.

The auxiliary electric power Es is an electric power required for driving the vehicle auxiliary 50 and the FC auxiliary 51. It is set for both auxiliaries respectively according to the operation states thereof.

Figure 3:
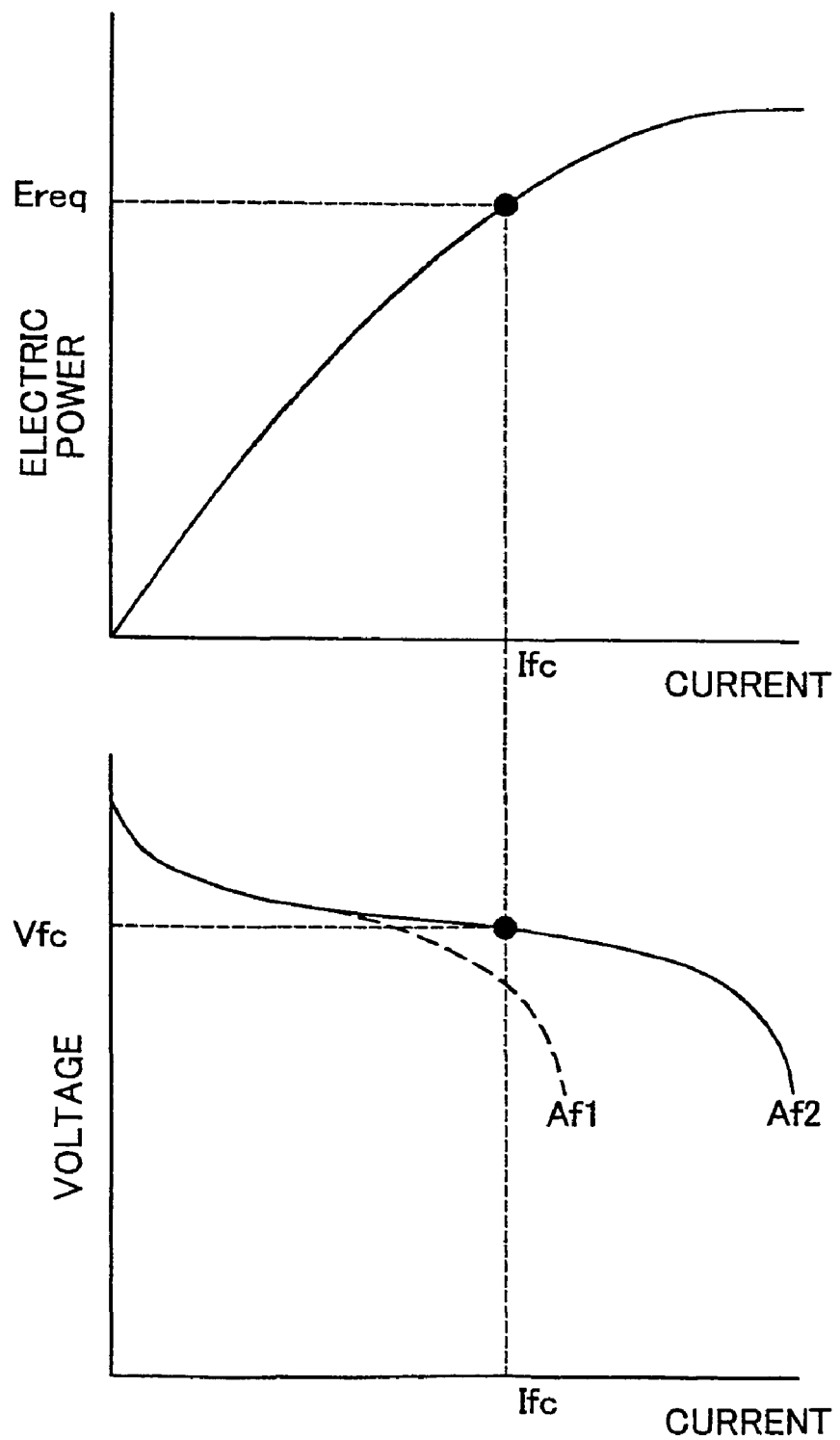
FIG. 3 is an explanatory diagram showing output characteristics of a fuel cell.

The control unit 10 sets the output voltage of the fuel cell 40 so as to output the required electric power Ereq set in step S10 and controls the gas, flow rate of the fuel cell 40 (step S12). The voltage is set according to a map described below. FIG. 3 is an explanatory diagram showing output characteristics of the fuel cell 40. The upper graph shows a relationship between electric power and electric current, and the lower graph shows a relationship between voltage and electric current.

The output characteristics of the fuel cell 40 change according to the flow rate of gas supplied. A curve Af1 in the lower graph shows a state with a low gas flow rate whereas a curve Af2 shows a state with a high gas flow rate. When the gas flow rate is low, a point at which the voltage starts to drop shifts to a low-current side.

An electric current Ifc according to the required electric power Ereq can be obtained based on the power-current characteristics map (upper graph). A voltage Vfc according to the electric current Ifc can be obtained based on the voltage-current characteristics map (lower graph). When the gas flow rate of the fuel cell 40 is low and the required electric power cannot be output at a sufficient voltage value, a target value for the gas flow rate is also set based on these characteristic maps.

Next, the control unit 10 sets the output voltage of the DC-DC converter 30 (step S14). When discharging the battery 20, that is, when the charge/discharge electric power Eb is negative, the battery 20 is made to be the input side and the inverter 60 is made to be the output side. The output voltage is matched with the output voltage of the fuel cell 40. That is, when charge/discharge electric power Eb is positive, the inverter 60 is made to be the input side and the battery 20 is made to be the output side. The output voltage is a predetermined value suitable for charging the battery 20. This predetermined value may be constant or may fluctuate according to the electric power to be charged.

The control unit 10 controls the DC-DC converter 30 to a set output voltage and controls the inverter 60 so that a required electric power is supplied to the synchronous motor 61 (step S16). An electric power corresponding to the gas flow rate is output from the fuel cell 40 when the inverter 60 is switched. Further, an electric power corresponding to a difference between the electric power output from the fuel cell 40 and the electric power consumed by the inverter 60 is charged to or discharged from the battery 20. For example, when there is a response delay in the output from the fuel cell 40, the amount by which the required electric power Ereq is not met is compensated by the battery 20. The output from the battery 20 gradually decreases as the output from the fuel cell 40 approaches the required electric power Ereq. The above described control enables supplying of electric power with good response.

At least an electric power from the battery 20 is ensured for the vehicle auxiliary 50 and the FC auxiliary 51. The electric power from the fuel cell 40 or the synchronous motor 61 may be supplied to these auxiliaries when charging the battery 20.

C. Setting of Output Ratio

In this embodiment, as described for the electric power control, the fuel cell 40 is used as the main power source and the battery 20 is used as an auxiliary power source that compensates for the response delay of the fuel cell 40. The energy efficiency of the vehicle under the given precondition change depending on the output ratio of the fuel cell 40 and the battery 20. In this embodiment, the output ratio is set according to the following procedures so as to achieve a high energy efficiency.

Figure 4:
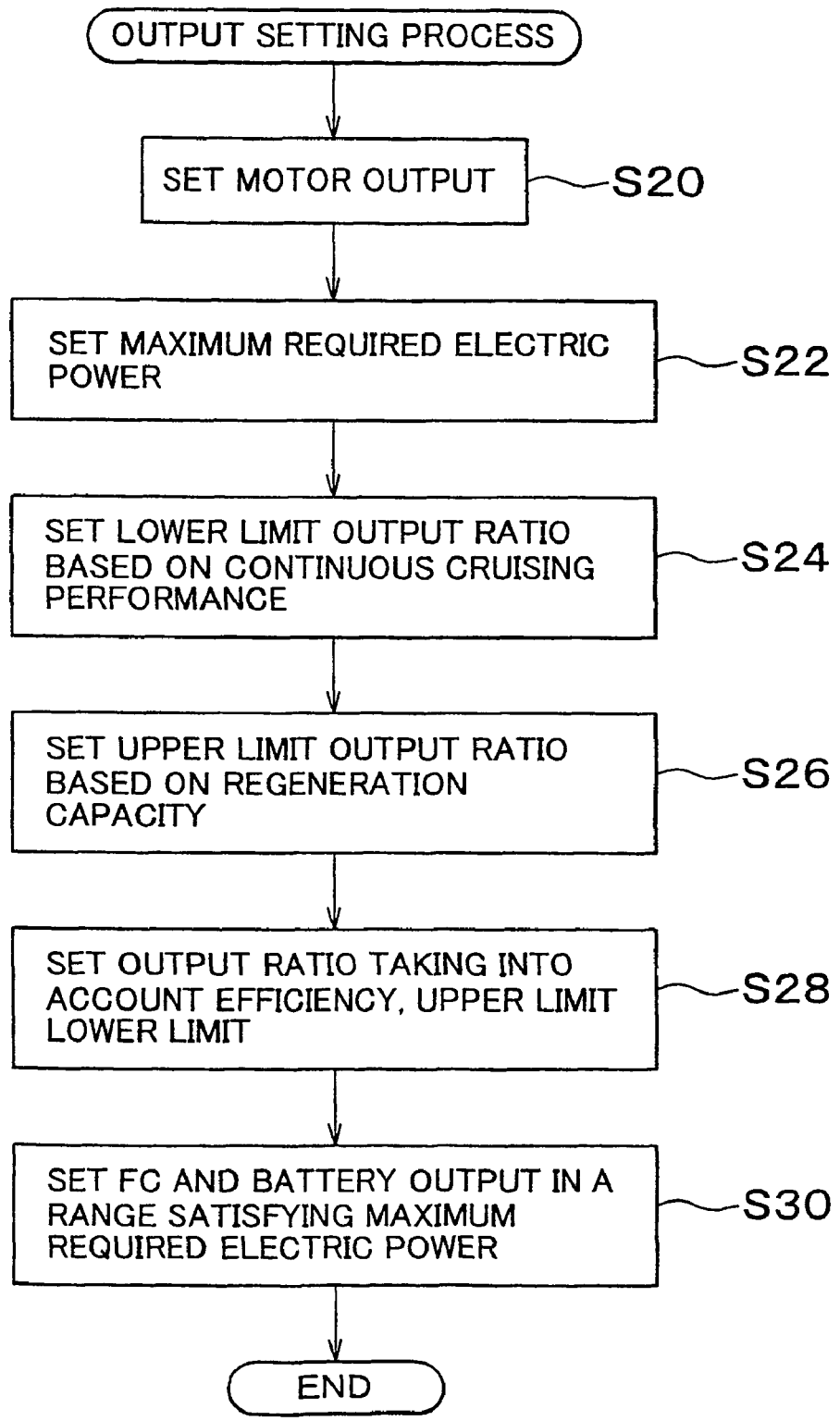
FIG. 4 is a process diagram showing a method for setting an output ratio of the fuel cell and a battery.

FIG. 4 is a process diagram showing a method for setting the output ratio of the fuel cell and the battery. First, a maximum output of the motor installed in a vehicle is set (step S20). This can be set based on the vehicle weight, target maximum speed, acceleration, and the like. Next, a maximum required electric power is determined by dividing the set maximum output by the motor operation efficiency (step S22). In addition to the motor output, the electric power consumed by the auxiliary may be taken into account. To fully utilize the motor capacity, the sum of the maximum outputs of the fuel cell 40 and the battery 20 needs to be equal to or greater than the maximum required electric power.

Meanwhile, a lower limit value and an upper limit value of the output ratio between the fuel cell 40 and the battery 20 are set based on a predetermined reference representative of the vehicle driving conditions. The output ratio refers to the maximum output of the fuel cell divided by the maximum outputs of the fuel cell and the battery. For example, the lower limit value can be set based on a continuous cruising performance (step S24). For example, a vehicle with vehicle weight of 2000 kg and motor efficiency of 80% is assumed. If the continuous cruising performance while on a 4.5% gradient at 120 km/h is set as the target value, the required electric power is calculated to be approximately 65 kW. If the maximum required electric power is assumed to be 100 kW, the output ratio required for outputting the required electric power for continuous cruising by the fuel cell 40 is set to be equal to or greater than 0.65.

The upper limit for the output ratio may be determined based on a regeneration capacity of the battery (step S26). It is preferable to charge the battery 20 with the electric power regenerated by the motor 61 upon braking so as to sufficiently raise the energy efficiency of the vehicle. If the capacity of the battery 20 is so small such that the regenerated electric power cannot be charged, energy efficiency is degraded. For example, the maximum regenerative electric power during deceleration is calculated to be 20 kW when driving a so-called 10-15 mode with a vehicle having a vehicle weight of 2000 kg and a motor efficiency of 80%. If the maximum required electric power is assumed to be 100 kW, the capacity of the battery 20 required for charging this regenerative electric power is 20 kW. Accordingly, the upper limit value of the output ratio is set to 0.8.

The lower and upper limits of the output ratio can be variously set according to the target performance of the vehicle irrespective of these driving conditions.

Next, the output ratio is set taking into account the energy efficiency of the vehicle, the upper limit, and the lower limit (step S28). The efficiency can be evaluated, for example, using the following method.

Figure 5:
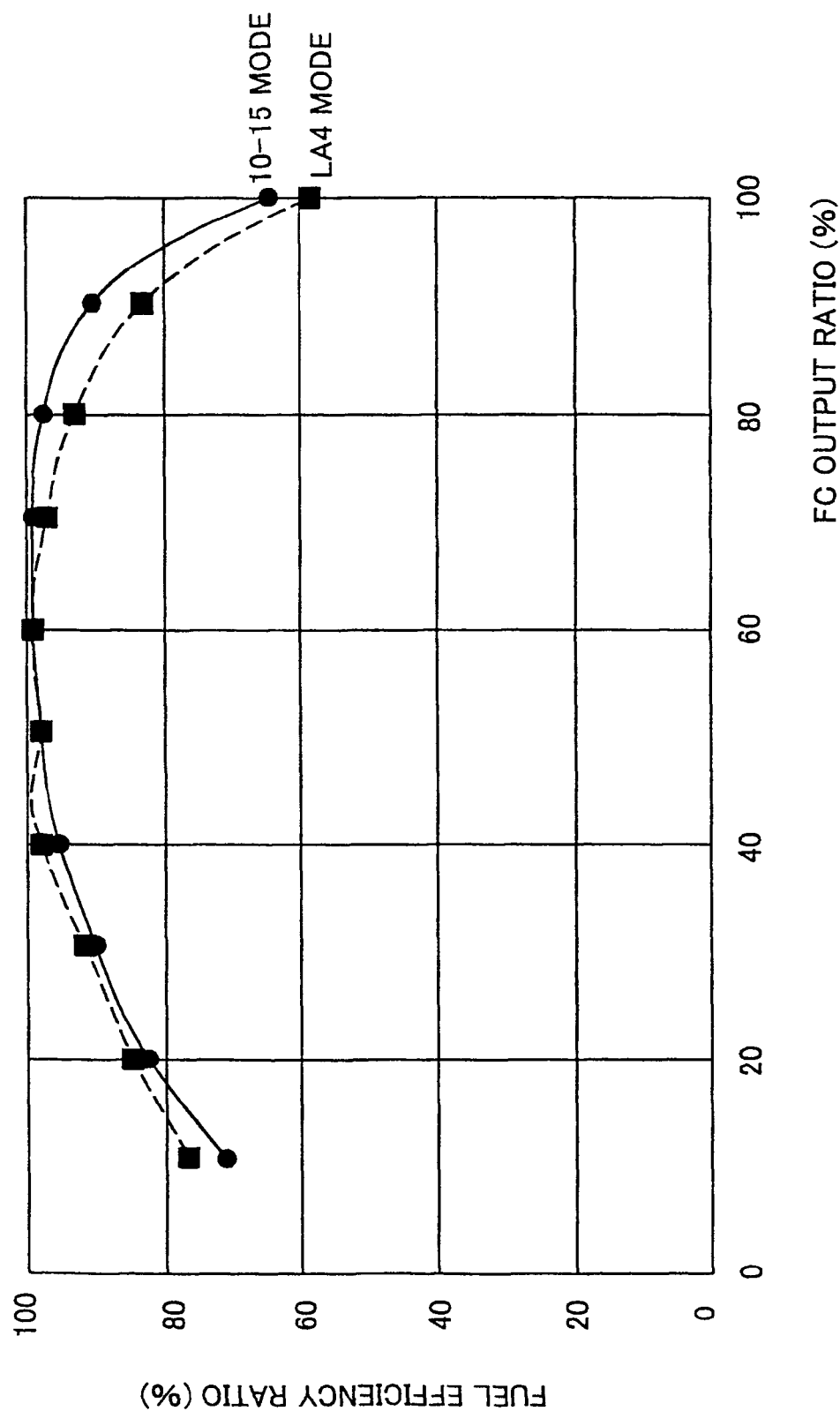
FIG. 5 is an explanatory diagram showing the relationship between the output ratio and a fuel efficiency ratio.

FIG. 5 is an explanatory diagram showing the relationship between the output ratio and the fuel efficiency ratio. It shows the results of simulating the fluctuation of fuel efficiency when the output ratio is varied, assuming a vehicle with a vehicle weight of 2000 kg and a motor efficiency of 80%. In the figure, the results for 10-15 mode are shown by a solid line and the results for LA4 mode are shown by a broken line. The LA4 mode is a driving mode used in the U.S. as a reference for calculating fuel efficiency. Fuel efficiency ratio refers to the fuel efficiency at each output ratio normalized by the maximum fuel efficiency. As shown in the figure, the fuel efficiency ratio becomes significantly high in an output range of 40% to 80%.

If the aforementioned upper limit value of 80% and lower limit value of 65% for the output ratio are considered for the high energy efficiency range, the appropriate range for the output ratio in this embodiment is between 65% to 80%. The outputs of the fuel cell 40 and the battery 20 are set so as to satisfy the conditions under which the output ratio falls within this range and the conditions under which the sum of the maximum output becomes equal to or greater than the maximum required electric power (step S30). It is most preferable to set the output ratio such that the sum of the maximum outputs of the fuel cell 40 and the battery 20 coincides with the maximum required electric power.

Figure 6:
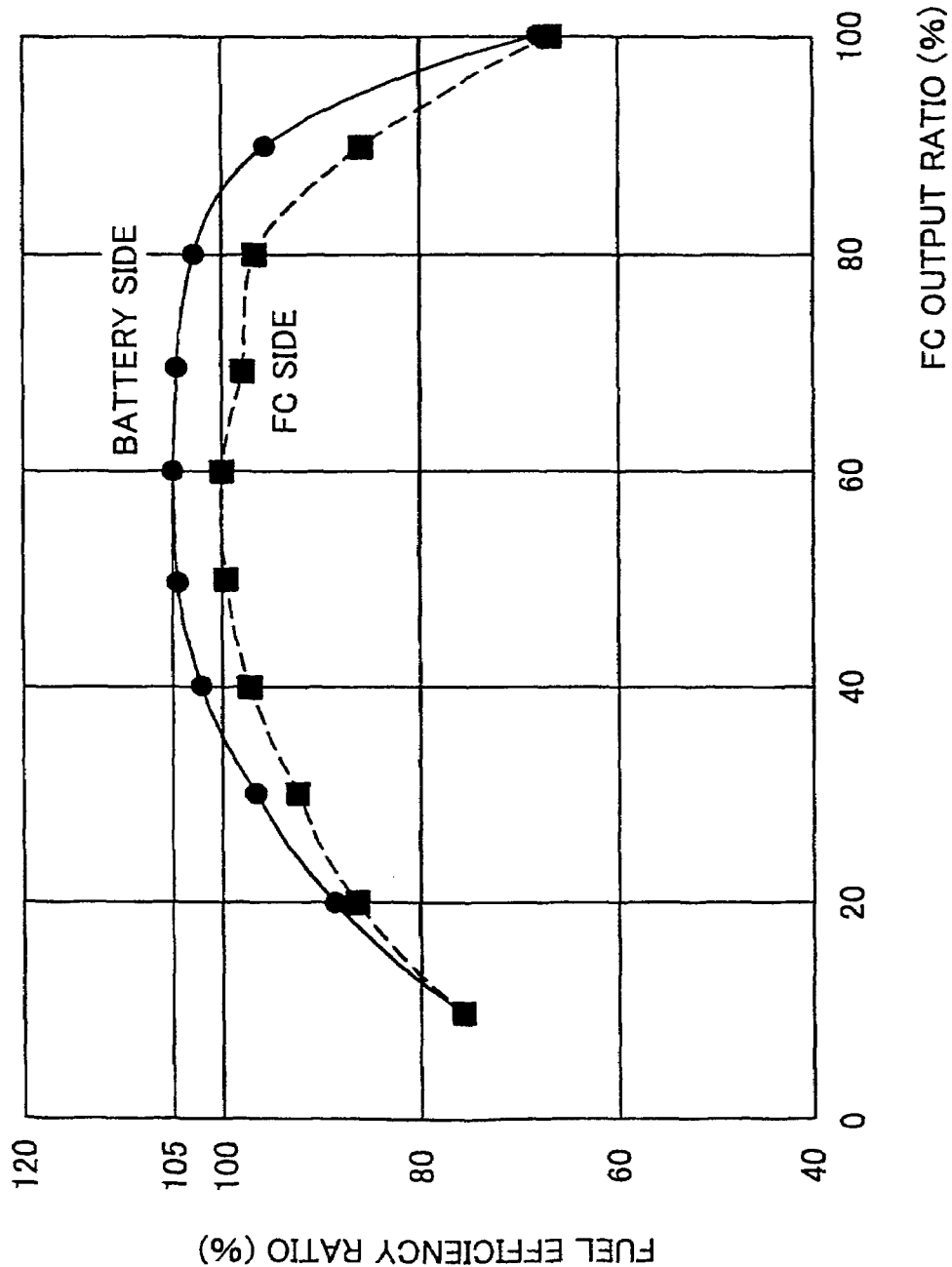
FIG. 6 is an explanatory diagram showing the fuel efficiency improvement effect.

D. Effect:

According to the lower source system of this embodiment explained above, there is an advantage of good-fuel efficiency by providing the DC-DC converter 30 on the battery 20 side. FIG. 6 is an explanatory diagram showing the fuel efficiency improvement effect. The broken line indicates the fuel efficiency in the case where the position of the DC-DC converter is switched to the fuel cell side in the structure in FIG. 1. The solid line indicates the fuel efficiency for the structure employed in this embodiment. The fuel efficiency is indicated as being normalized by the maximum value of the former. As shown in the figure, fuel efficiency is improved by approximately 5% maximum by connecting the DC-DC converter to the battery side. The following is considered to be the reason for this.

Ordinarily, the efficiency of the DC-DC converter at voltage conversion is usually in the range of approximately 90 to 95%. In this embodiment, the fuel cell is used as the main power source. Accordingly, when the DC-DC converter is connected to the fuel cell side, most of the electric power output from the power source system suffers loss due to voltage conversion. This loss due to voltage conversion can be controlled by connecting the DC-DC converter to the battery side that outputs a relatively small amount of electric energy.

By connecting the DC-DC converter the battery side that has a relatively small amount of electric energy, the size of the DC-DC converter can be reduced, and thereby the size of the entire power source system may be reduced.

In the power source system of this embodiment, the vehicle auxiliary 50 and the FC auxiliary 51 are connected between the battery 20 and the DC-DC converter 30. Consequently, even in the case where the DC-DC converter 30 fails or the fuel cell 40 is unable to generate electricity, electric power supply to these auxiliaries is ensured. For example, consider a case where the fuel cell 40 is unable to generate sufficient electricity due to the fact that it is not warmed up. In this embodiment, the FC auxiliary 51 can be driven by the electric power from the battery 20 so as to warm up and start the fuel cell 40. The operation of the vehicle auxiliary 50 can also be ensured within the capacity of the battery 20. Accordingly, reliability of the power source system and the vehicle can be improved by this embodiment.

According to this embodiment, the output ratio of the fuel cell 40 and the battery 20 can be optimized and a high energy efficiency can be achieved. A system design that satisfies both performance and energy efficiency can be achieved by setting the output ratio taking into account the operation efficiency as well as the target performance that defines the upper and lower limits.

Various embodiments of the invention have been described heretofore, however, the invention is not limited to these embodiments and may be in various forms within scope and spirit of the invention. For example, the invention may be applied to power source systems of various devices in addition to a vehicle.

The invention claimed is:

1. A direct current power source comprising:
   a pair of terminals that output electric power;
   a fuel cell connected to the terminals; and
   an electric power storage device connected to the terminals in parallel with the fuel cell,
   wherein a ratio of a maximum output of the fuel cell to a maximum total output of the fuel cell and the electric power storage device is in a range of equal to or greater than 0.65 and equal to or less than 0.8.

2. A direct current power source according to claim 1, wherein a maximum output of the fuel cell is equal to or greater than a target value of an electric power to be output from the terminals continuously for a predetermined period.

3. A direct current power source according to claim 1, wherein a capacity of the electric power storage device is equal to or greater than a maximum value of an electric power input to the terminals.

4. A direct current power source according to claim 1, wherein the maximum total output of the fuel cell and the electric power storage device is equal to or greater than a maximum required electric power required from the terminals.

5. A direct current power source according to claim 1, further comprising a DC-DC converter connected between the electric power storage device and the terminals.

6. A direct current power source according to claim 1, wherein the electric power storage device is a secondary battery.

7. A vehicle having a motor as a power source, comprising:
   a direct current power source that supplies electric power to the motor; and
   a drive circuit that drives the motor by the electric power, wherein the direct current power source includes:
      a pair of terminals that output electric power;
      a fuel cell connected to the terminals; and
      an electric power storage device connected to the terminals in parallel with the fuel cell,
      and wherein a ratio of a maximum output of the fuel cell to a maximum total output of the fuel cell and the electric power storage device is in a range equal to or greater than 0.65 and equal to or less than 0.8.

8. A vehicle according to claim 7, wherein a maximum output of the fuel cell is equal to or greater than a required electric power during cruising of the vehicle.

9. A vehicle according to claim 7, wherein a capacity of the electric power storage device is equal to or greater than a maximum value of an electric power regenerated by the motor.

10. A vehicle according to claim 7, wherein a maximum total output of the fuel cell and the electric power storage device is equal to or greater than a maximum required electric power required from the direct current power source.

11. A vehicle according to claim 7, wherein the direct current power source further comprises a DC-DC converter connected between the electric power storage device and the terminals.

12. A vehicle according to claim 7, wherein the electric power storage device is a secondary battery.

13. A method for designing a direct current power source in which a fuel cell and an electric power storage device are connected in parallel, comprising the steps of:
   setting a maximum total output of the fuel cell and the electric power storage device to be equal to or greater than a maximum required electric power required for the direct current power source;
   setting a ratio of a maximum output of the fuel cell to a maximum total output of the fuel cell and the electric power storage device to be equal to or greater than 0.65 and equal to or less than 0.8;
   setting the maximum output of the fuel cell to be equal to or greater than a target value of an electric power to be continuously output for a predetermined period; and
   setting a capacity of the electric power storage device to be equal to or greater than a maximum electric power input to the direct current power source from an external device.

* * * * *